Dec. 9, 1969 S. H. HUNKINS ET AL 3,483,329

MULTIPLEX LOOP SYSTEM

Filed Feb. 11, 1966 11 Sheets-Sheet 1

INVENTORS
STANLEY H. HUNKINS
PETER W. BERESIN
BY
ATTORNEYS

INVENTORS
STANLEY H. HUNKINS
PETER W. BERESIN
BY
ATTORNEYS

INVENTOR
STANLEY H. HUNKINS
BY PETER W. BERESIN

ATTORNEY

INVENTORS
STANLEY H. HUNKINS
PETER W. BERESIN
BY
Rennie Edmonds Morton Taylor & Adams
ATTORNEYS INVENTORS
STANLEY H. HUNKINS
PETER W. BERESIN
BY
Pennie Edmonds Morton Taylor & Adams
ATTORNEYS

MULTIPLEX LOOP SYSTEM

Filed Feb. 11, 1966 11 Sheets-Sheet 6

INVENTOR
STANLEY H. HUNKINS
PETER W. BERESIN
BY

ATTORNEY

INVENTORS
STANLEY H. HUNKINS
PETER W. BERESIN
BY
ATTORNEYS

INVENTORS
STANLEY H. HUNKINS
PETER W. BERESIN
BY
ATTORNEYS

INVENTORS
STANLEY H. HUNKINS
PETER W. BERESIN
BY Pennie Edmonds Morton Taylor & Adams
ATTORNEYS

INVENTORS
STANLEY H. HUNKINS
PETER W. BERESIN
BY
ATTORNEYS

Dec. 9, 1969 S. H. HUNKINS ET AL 3,483,329

MULTIPLEX LOOP SYSTEM

Filed Feb. 11, 1966 11 Sheets-Sheet 11

INVENTORS
STANLEY H. HUNKINS
PETER W. BERESIN

BY Bernie Edwards Norton Taylor & Adams

ATTORNEYS

United States Patent Office 3,483,329
Patented Dec. 9, 1969

3,483,329
MULTIPLEX LOOP SYSTEM

Stanley H. Hunkins, Cherry Hill, N.J., and Peter W. Beresin, Philadelphia, Pa., assignors to Ultronic Systems Corp., Pennsauken, N.J., a corporation of Delaware Filed Feb. 11, 1966, Ser. No. 526,783
Int. Cl. H04j 3/02
U.S. Cl. 179—15 9 Claims

ABSTRACT OF THE DISCLOSURE

Teletype loop configuration wherein a multiplex message identification pattern is repeatedly transmitted around the loop, and wherein each of the Teletype stations includes apparatus to select the time slot of another Teletype station, and apparatus for inserting a busy signal in a part of the selected time slot, to seize the slot and lock out all but the two communicating Teleype stations.

This invention relates to a communication system, and particularly to a loop communication system which permits any station to communicate selectively with any other.

Conventional telephone and Teletype communication systems permit any one station to communicate selectively with another. However considerable switching is commonly involved and the systems are expensive, particularly if privacy and availability at all times are desired. The present invention provides a system which can be considerably less expensive than those now available, while providing quick and accurate communication to meet many needs.

In accordance with the invention, a plurality of terminal units are provided at desired stations and connected by communication channels in a loop configuration such that messages from one terminal unit to another travel around the loop to the desired receiving station and back to the transmitting station where new messages are inserted. The terminal units may be located in the same city, or in different cities spread over a large geographical area.

The invention particularly contemplates multiplex messages passing continuously around the loop with a particular location in each multiplex message containing a character of the message intended for a particular receiving station. As successive multiplex messages arrive at the transmitting station, new characters are inserted in the proper location until the complete message has been sent. A multiplex message format is employed having an initial portion containing a predetermined bit pattern (1-bits and 0-bits) for identifying the message and for synchronizing purposes. This is followed by a plurality of time slots each allocated to a particular receiving station and containing a plurality of bit positions for message characters intended for that receiver. Advantageously each time slot includes a "Busy bit" position indicating whether or not that slot is in use. Also, advantageously, a bit position is allocated for the insertion of an "Acknowledge bit" indicating that the slot information has been received. Further, to insure accuracy, a parity bit position may be allocated.

In accordance with a specific embodiment of the invention, when a given station desires to transmit to another, provision is made to recognize the presence or absence of a busy bit in the corresponding receiver time slot. If the busy bit is absent, the station is enabled for transmission. Successive characters of the message are then inserted in the proper time slot of successive multiplex messages and acted upon in succession at the receiver until the entire message has been transmitted and received, whereupon the time slot is released for transmission from other stations. As each multiplex message arrives at a receiver, the receiver determines whether there is a message character in its time slot, and if so inserts an Acknowledge bit in the time slot and proceeds to process the message character contained therein.

Various types of communication apparatus may be employed to transmit coded information in the successive multiplex messages. However, it is particularly contemplated to employ conventional Teletype apparatus for the purpose, and the specific embodiment described hereinafter is especially designed for it. The specific embodiment contains a number of features for promoting the efficiency and reliability of the system which will be appreciated by those skilled in the art as the description proceeds.

Figure 1:
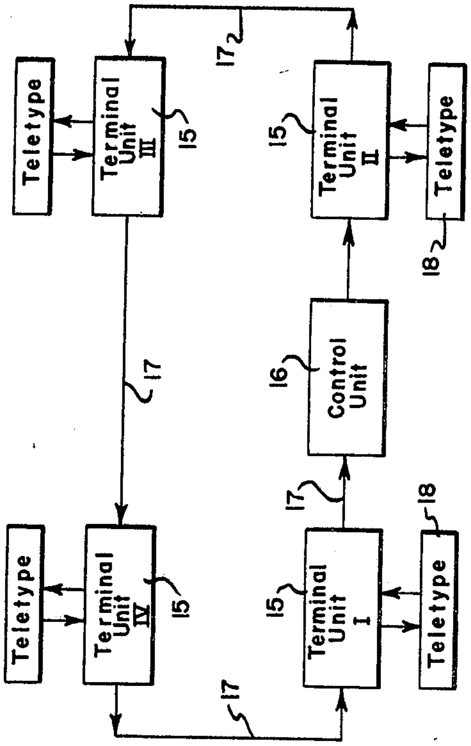
FIG. 1 is a block diagram of a communication system in accordance with the invention.
Figures 4B, 4C:
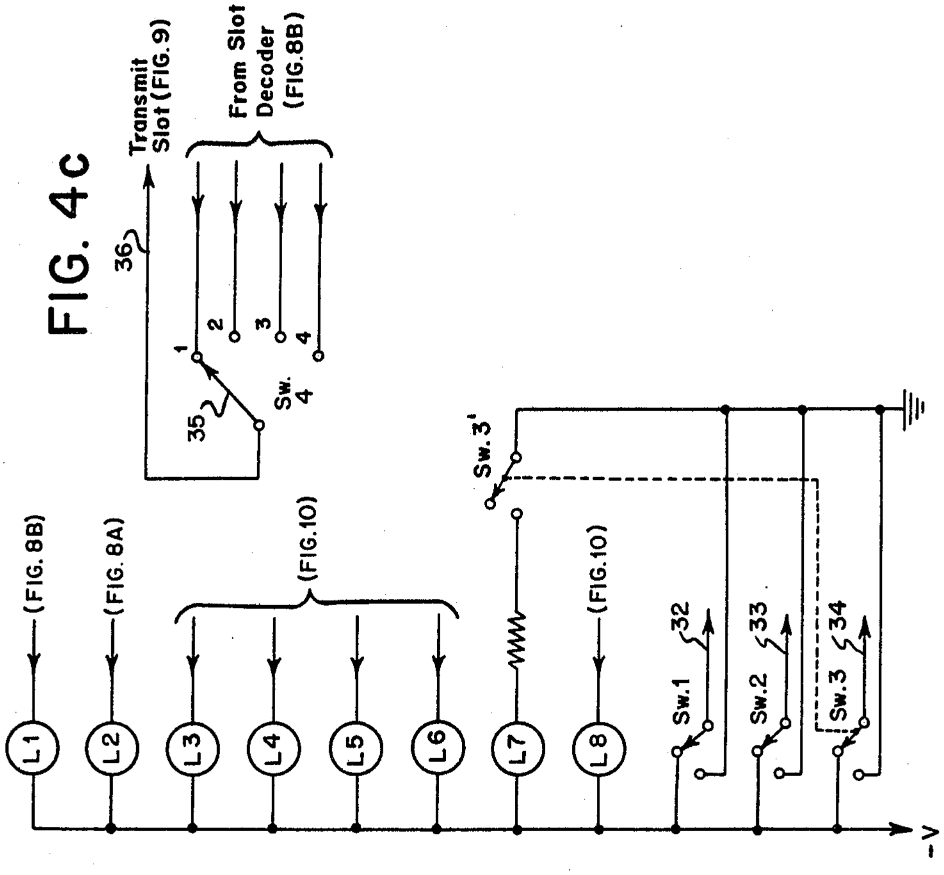
Figure 4A:
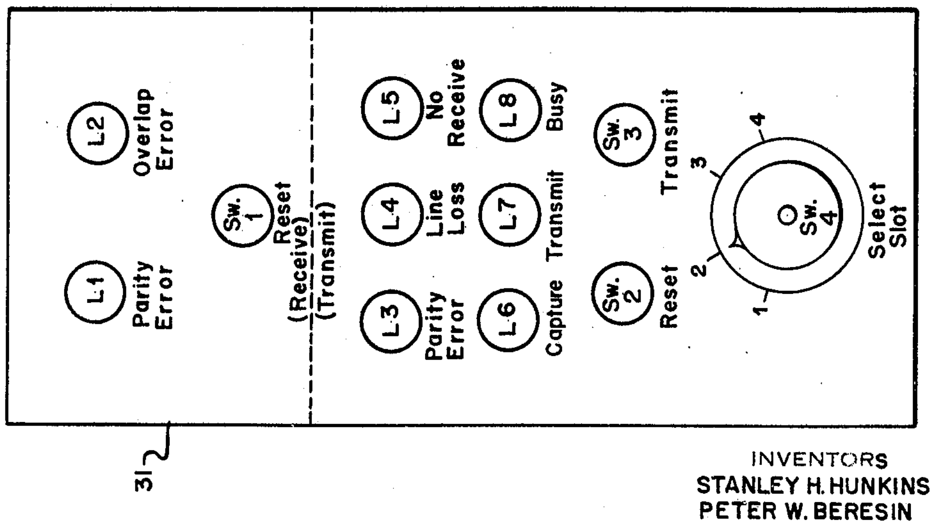
Figure 5:
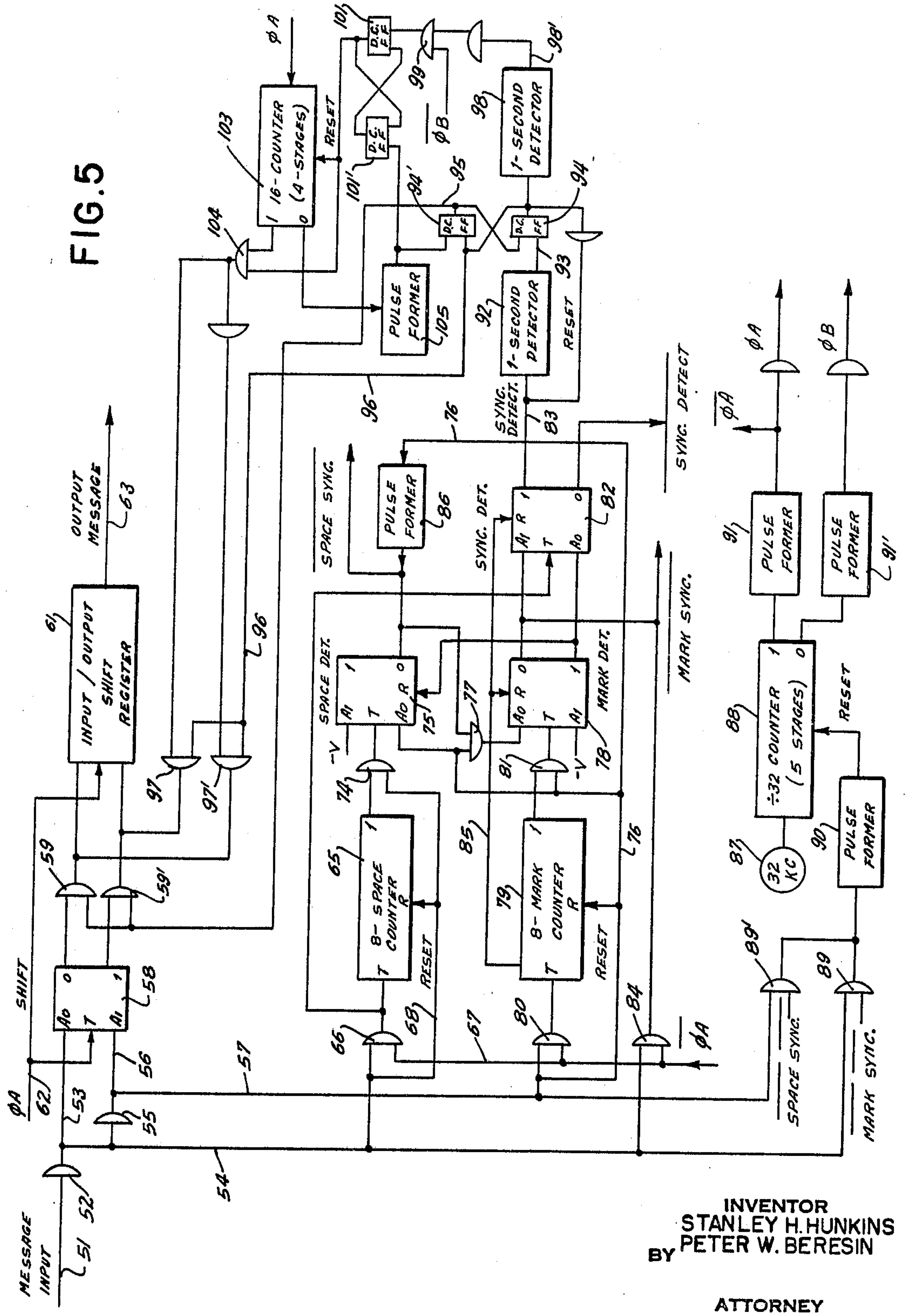
Figure 6:
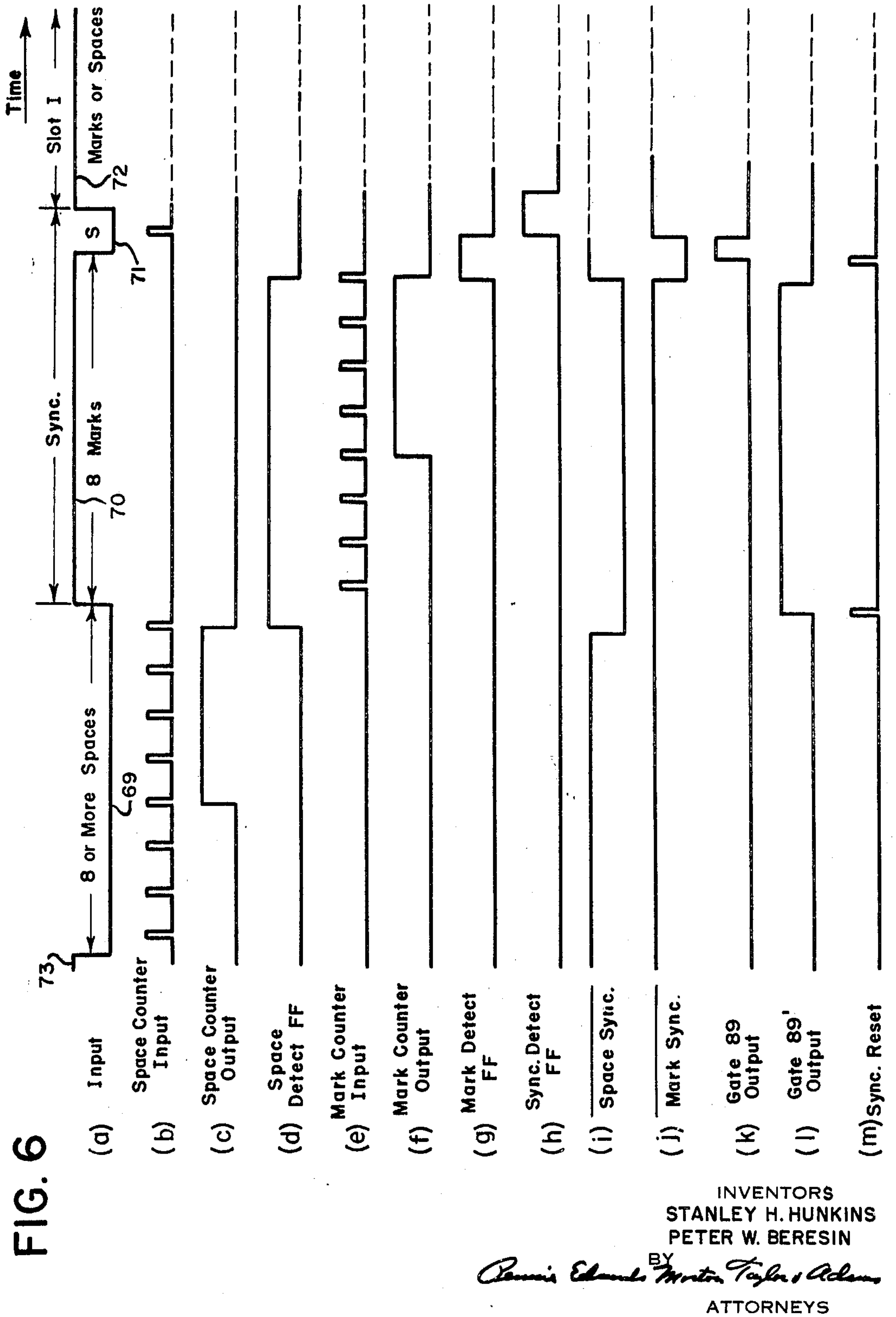
Figure 7:
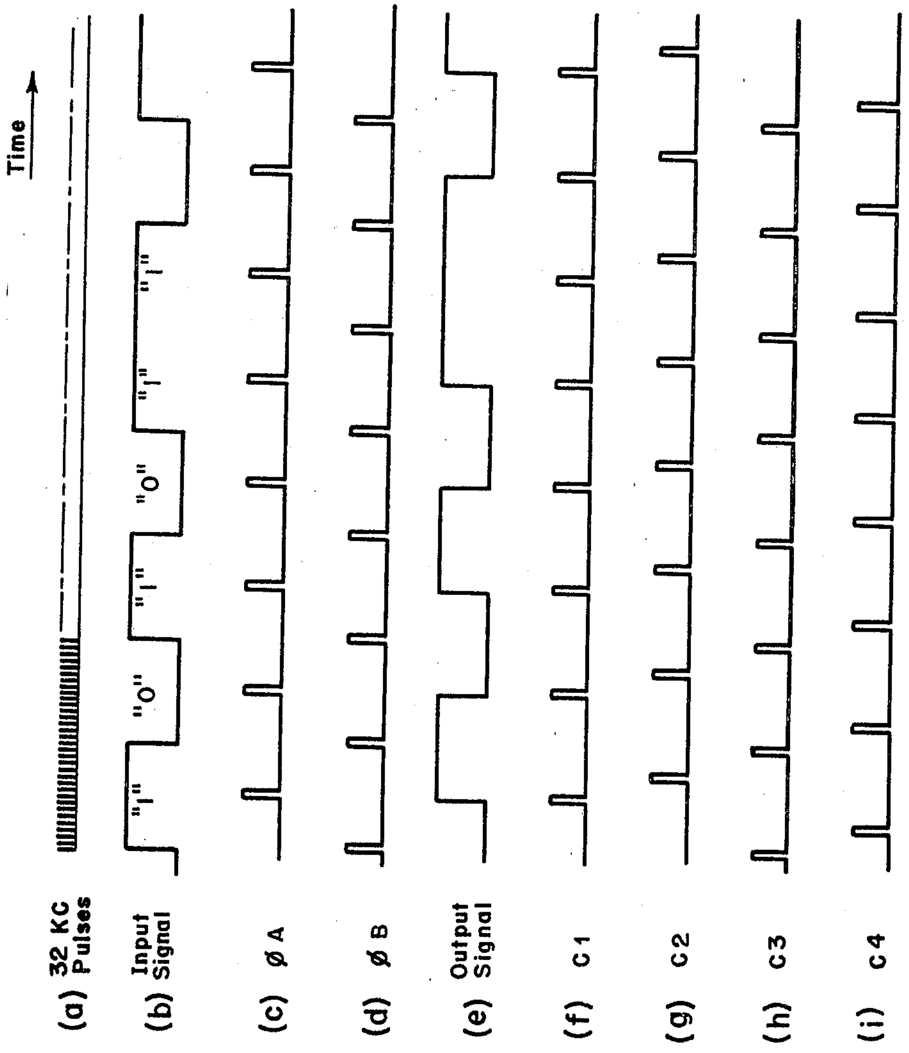
Figure 8A:
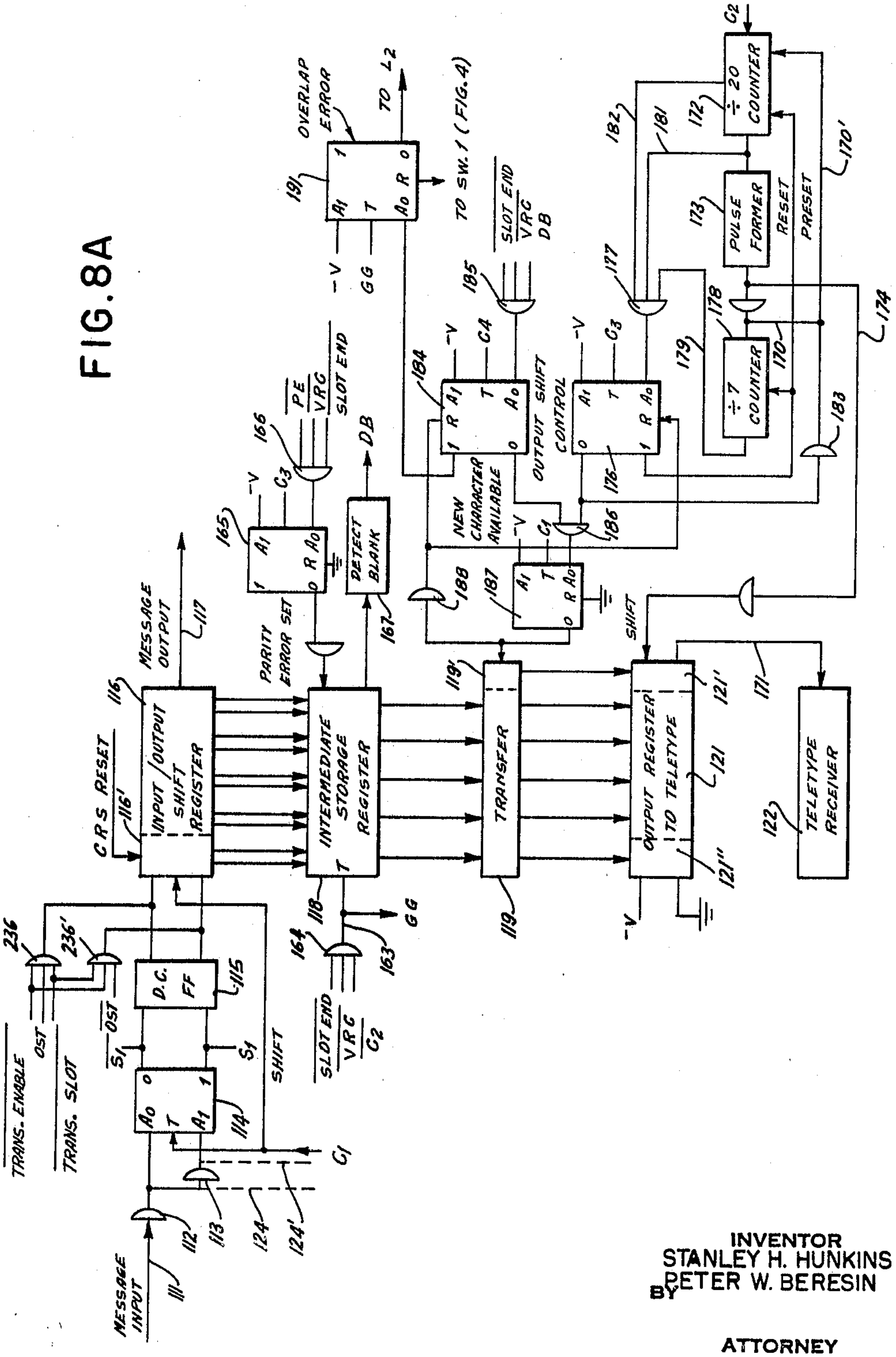
Figure 8B:
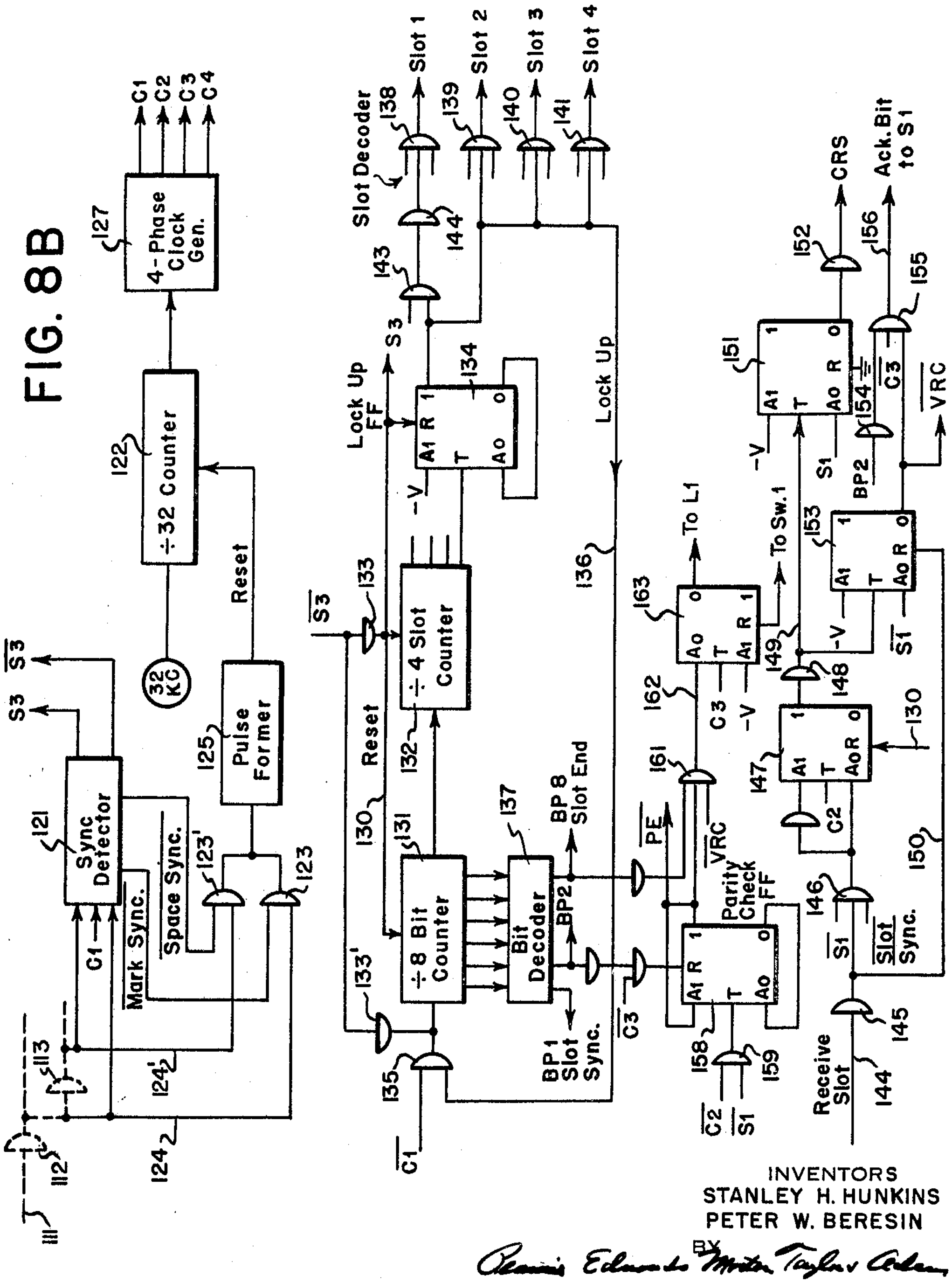
Figure 9:
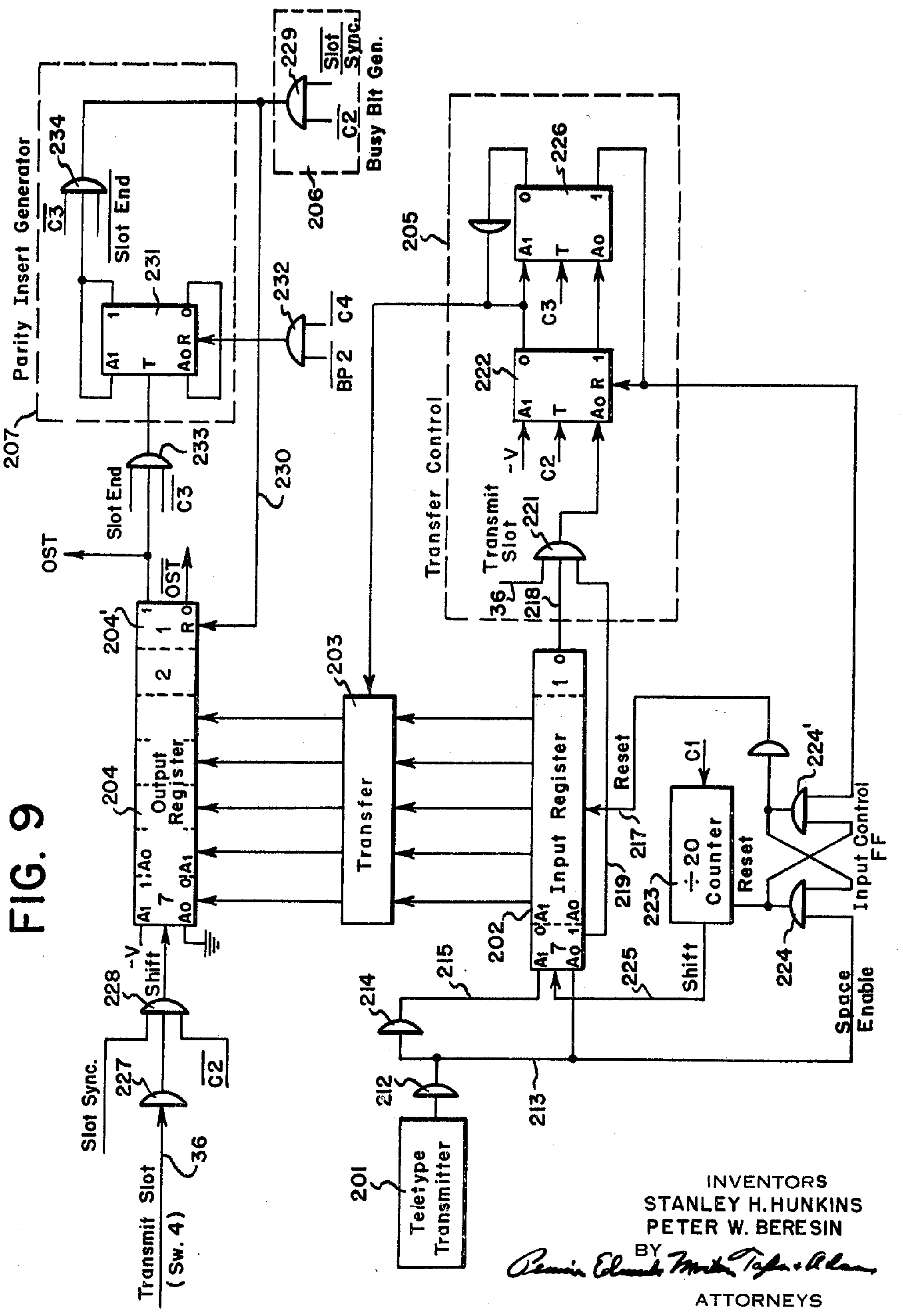
Figure 10:
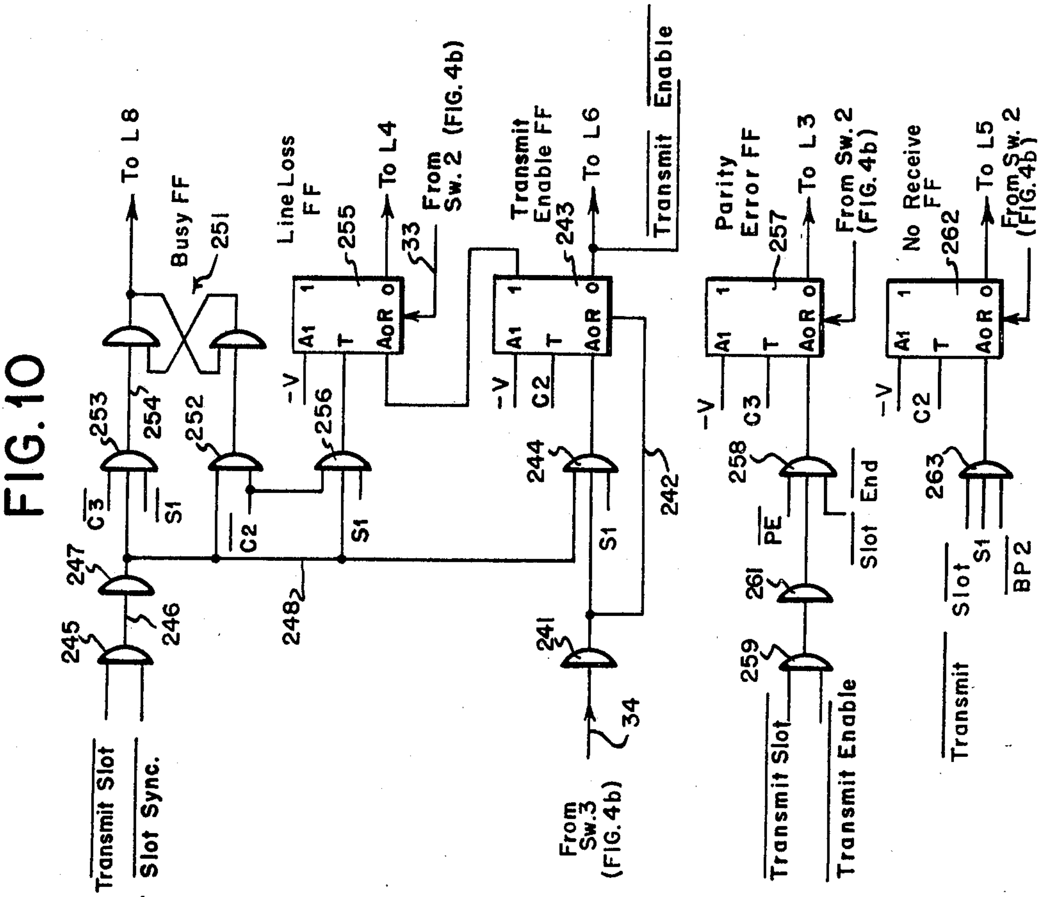
Figure 11:
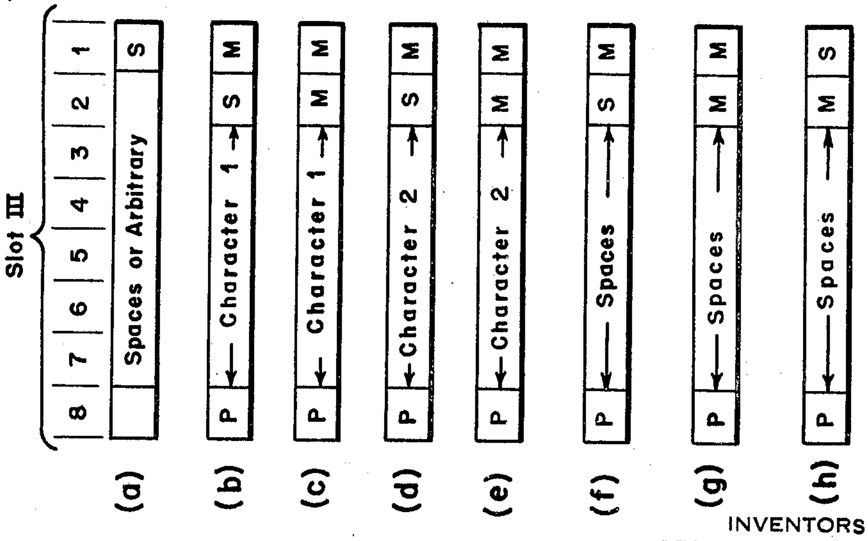
Figure 12A:
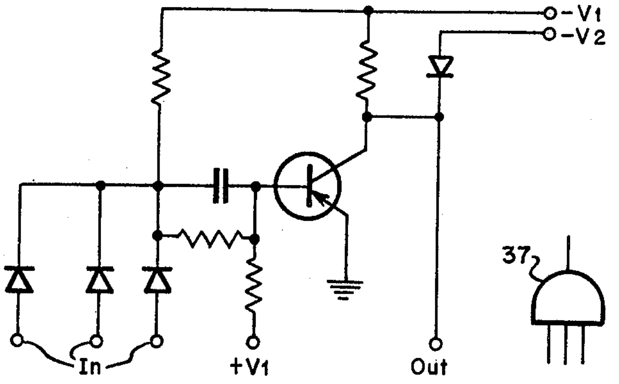
Figure 12B:
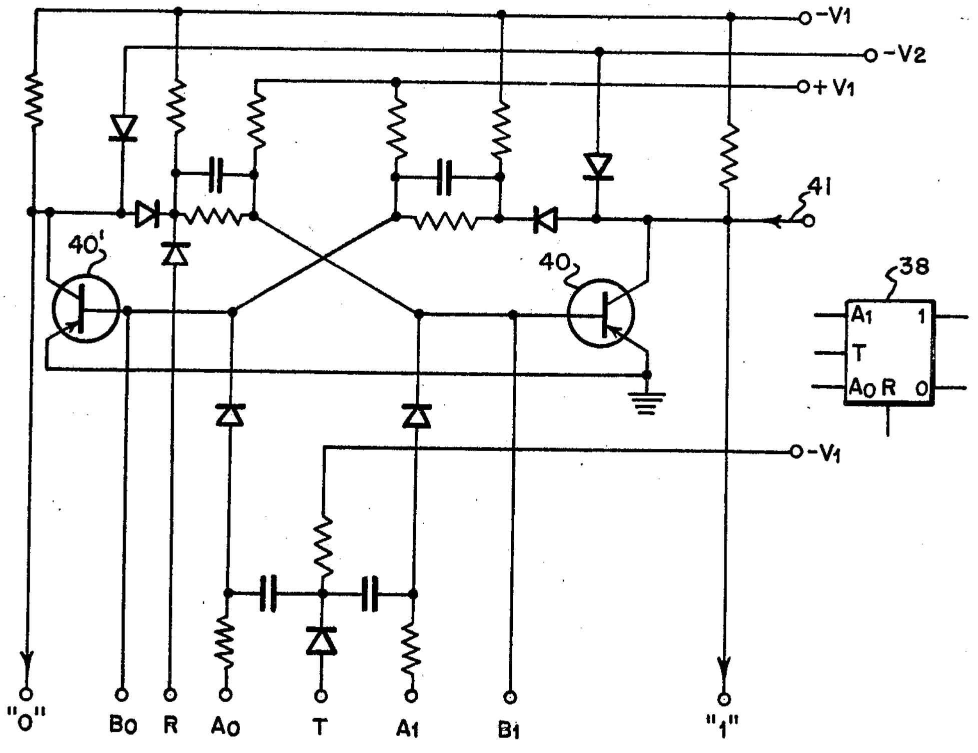
Figures 12C, 13:
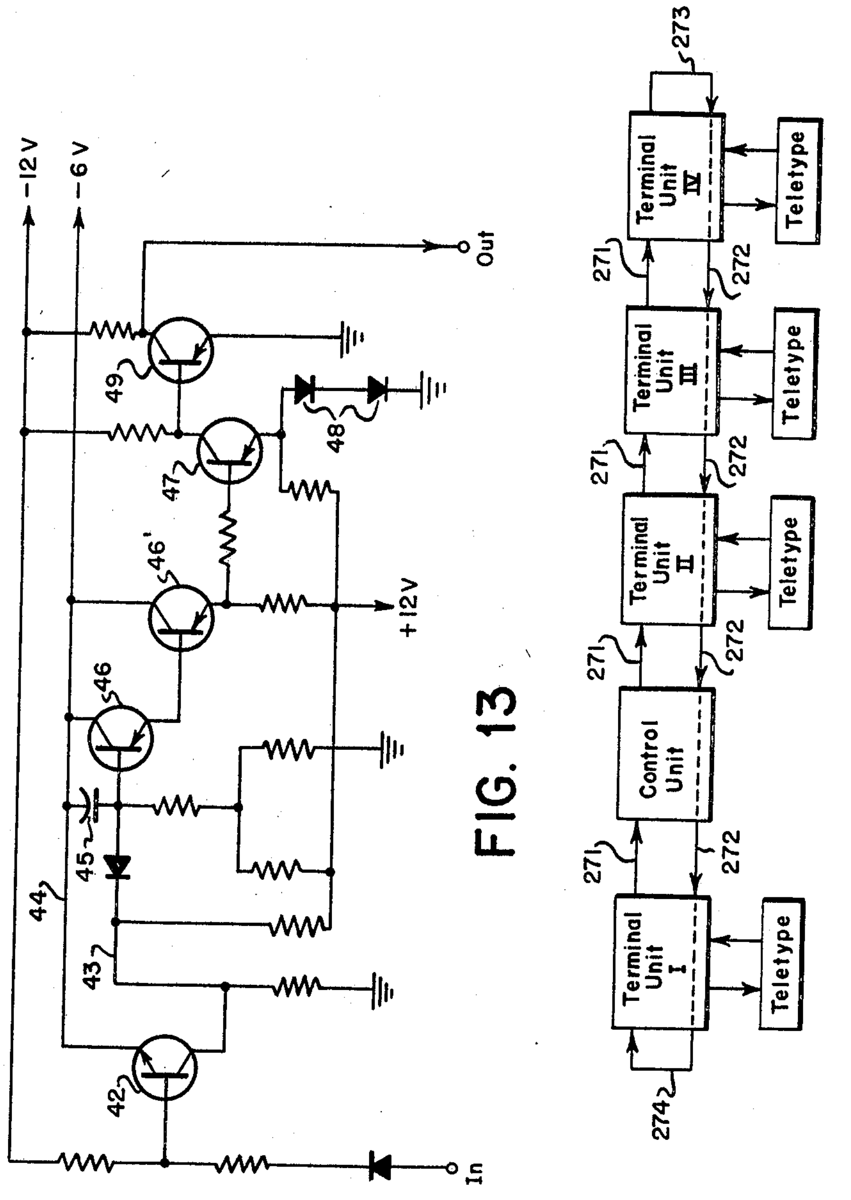

FIGS. 4*a, b, c* illustrate the face of an operator console used at a terminal unit and circuits contained therein;

FIG. 5 is a circuit diagram of the control unit used in FIG. 1;

FIG. 6 shows waveforms pertaining to the identification pattern recognition at the control and terminal units;

FIG. 7 shows waveforms pertaining to the synchronizing portions of the control and terminal units;

FIGS. 8A and 8B are circuit diagrams of the receiving portions of a terminal unit;

FIG. 9 is a circuit diagram of the transmitting portion of a terminal unit;

FIG. 10 is a circuit diagram of a portion of a terminal associated with the operator console thereat;

FIG. 11 is explanatory of changes in a message slot under selected conditions;

FIGS. 12*a, b, c* are circuit diagrams of a NOR gate, a flip-flop, and an *x*-second detector suitable for use in the control and terminal units; and FIG. 13 is a block diagram showing a modification of FIG. 1.

Referring to FIG. 1, terminal units 15 and control unit 16 are shown connected in a loop configuration by unidirectional transmission channels 17. The number of terminal units may be selected as desired, and four are here shown. Each terminal unit has a transmit/receive unit 18 connected thereto, here shown as a conventional Teletype unit. Other types of communication units may be employed if desired, and certain terminal units may have only transmit, or only receive, units connected thereto. As illustrated, each terminal unit 15 may transmit messages to any other unit, and receive messages therefrom.

Figure 2:
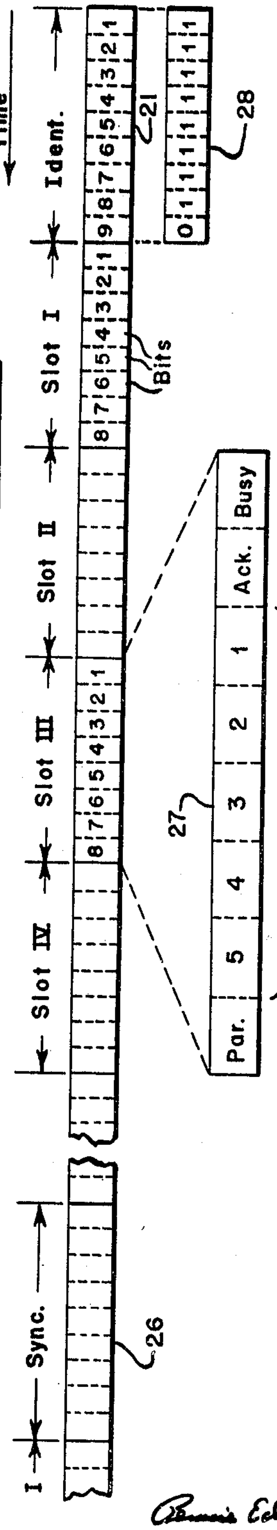
FIG. 2 illustrates the format of the multiplex message used in the system of FIG. 1.

FIG. 2 shows a suitable multiplex message format for the loop arrangement of FIG 1. The initial portion 21 is a digital bit pattern used for identification and synchronizing purposes. It permits recognizing the message and synchronizing the slot recognition circuits in the terminal units. For convenience, it will hereafter be called the sync pattern. Following the sync pattern are message slots I–IV for each of the terminal units in the loop. Each message has a plurality of bit positions for message data and control purposes, eight being here shown. After one multiplex message has passed around the loop, a subsequent message begins with a sync pattern as indicated at 26. These multiplex messages pass continually around the loop during the period of operation, with the slot contents changing an accordance with message transmissions.

Each slot is assigned to a particular terminal unit for receiving purposes. Thus messages for terminal unit I are inserted in slot I, for terminal unit II in slot II, etc. Any terminal unit can transmit to another by inserting message data in the proper slot. As here shown, a given slot in a multiplex message contains one character of the message for that terminal unit. Then subsequent multiplex messages will contain successive characters in that slot until the message transmission is completed.

The slot format in this specific embodiment is shown at 27, which is an expansion of slot III. Bit position 1 is allocated to a "busy" signal indication. This signal is a "mark" (or "1"). When present it indicates that a message is being transmitted to terminal unit III, and no other terminal unit can transmit thereto. If not present ("space" or "0"), a terminal unit desiring to send a message to unit III inserts a busy signal and begins transmitting. Bit position 2 is allocated to an Acknowledge signal which is inserted by the receiver at unit III to indicate that the particular message character has been received. Bit positions 3–7 are allocated to the character to be transmitted, this corresponding to the number of bits conventionally used in Teletype characters. They are designated 1–5. Bit position 8 is allocated to a parity bit, used to insure that the character in bit positions 3–7 is correct.

The sync pattern used in this specific embodiment is shown at 28, and consists of eight 1-bits followed by a 0-bit.

Figure 3:
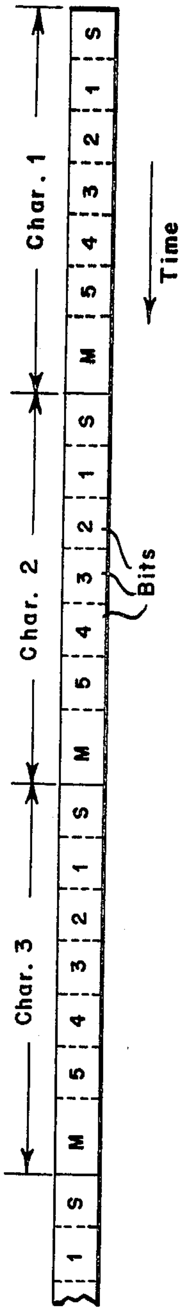
FIG. 3 illustrates a conventional Teletype message format.

FIG. 3 shows a conventional Teletype format. A character begins with a space S, followed by five bits representing the coded character, and then a mark M. Customarily the final mark is longer than the preceding bits, e.g. 1.42 or 1.5 bits. The five bits representing the Teletype data are numbered the same as at 27 in FIG. 2. Successive characters are transmitted at a rate depending on the Teletype installation, for example, 10 characters per second.

In general, the transmission time of the multiplex message around the loop of FIG. 1, or loop delay, should not be greater than the period of the Teletype characters so that the message slots will be available as fast as the Teletype characters. Thus, for 10 Teletype characters per second the loop delay should not be greater than 100 milliseconds.

Further, the length of the multiplex message should in general not exceed the loop delay, to avoid overlap. In this specific embodiment a space equal to a time slot is left between messages, for purposes to be described. For a given multiplex message length, the number of slots available will depend on the transmission bit rate. For example, assuming a 1 kc. bit rate, 100 bits can be transmitted in 100 milliseconds and will accommodate the identifying or sync pattern and 10 slots. Voice grade simplex telephone lines allow transmission bit rates up to about 2.4 kc., so that if more slots are desired the bit rate can be increased.

The loop delay comprises delays in the terminal and control units, as well as in the transmission lines themselves. If the delay is insufficient, additional delay can be introduced. Advantageously this is done in the control unit so that the terminal units can be standardized.

FIG. 4*a* shows at 31 the face of an operator console used at each terminal unit 15. The upper portion relates to receiving and the lower to transmitting. Lamps L1 and L2 give visual indication of parity and overlap errors detected at the receiver, and switch SW1 is used for reset. Lamps L3–L8 give visual indications relating to transmitting, as shown by the legends. Switches SW2 and SW3 are reset and transmit switches respectively, and switch SW4 enables the operator to select the slot corresponding to the receiver to which he wishes to transmit. Four positions are shown, corresponding to the four terminal units to FIG. 1.

FIG. 4*b* shows the connections to the lamps and switches of FIG. 4*a*, except for SW4. In this embodiment power is supplied by a negative voltage source designated −V. Thus grounding the other leads to the lamps will light them. The leads to the lamps, and leads 32, 33 and 34 to the switches, are connected to the terminal unit hereinafter described.

FIG. 4*c* shows the connections for SW4. The switch contacts are connected to a slot decoder in the terminal unit so that, by moving switch blade 35, a transmit signal for the desired slot can be supplied to lead 36. Ordinarily one terminal unit will not transmit to itself so the corresponding switch contact may be left unconnected.

The circuit diagrams shown in subsequent figures use digital logic elements. Many types of elements are known in the art and may be used as desired to perform the functions hereinafter described. The specific embodiment here shown uses NOR logic units, examples of which are shown in FIG. 12. These will be described at this point to facilitate understanding the circuit diagrams.

FIG. 12*a* shows a NOR circuit of known configuration which need not be described in detail. If any one of the three input lines designated "IN" is at ground potential, say corresponding to a binary 1, the transistor will be cut off and the output line desginated "OUT" will be negative (binary 0). If all inputs are negative, the transistor will conduct and the output will be at ground potential. For convenience, negative and ground potentials will usually be referred to hereinafter as "low" and "high," respectively. Thus the circuit functions as an AND gate with polarity inversion for input signals whose assertion levels are low, and as an OR circuit with inversion for signals whose assertion levels are high. The symbol 37 is used in the drawings. If only one input line is used, and the others left unconnected, the circuit functions as a polarity inverter.

FIG. 12*b* shows a bistable multivibrator or flip-flop circuit, also of known configuration. The circuit of transistor 40 may be considered the 1-side and that of 40′ the 0-side. When 40 is conducting the "1" output is high (ground) and when 40′ is conducting the "0" output is high. The reset input R is arranged so that, when it goes high, it cuts off 40. By the cross-connections, 40′ is turned on. Thus in the reset state the "0" output is high and the "1" output low. In the set state the conditions are reversed. The flip-flop may be switched from one state to the other by a pulse applied to trigger input T, under the control of steering inputs $A_0$ and $A_1$. If $A_0$ is high and $A_1$ low, a positive-going trigger pulse at T will cut off transistor 40′, thus turning on 40 and producing the set state wherein the "1" output is high. With the input voltages to $A_0$ and $A_1$ reversed, the trigger pulse will cut off transistor 40 thus turning on 40′ and producing the reset state wherein the "0" output is high.

Inputs $B_0$ and $B_1$ provide direct connections for forcing the flip-flop to one state of the other. Thus, making $B_0$ high produces the set state, and making $B_1$ high produces the reset state. In addition, an input is shown at 41, which is the same as the "1" output. If the flip-flop is in its 0-state with transistor 40′ conducting, a positive signal at 41 will change the flip-flop to its 1-state. Symbol 38 is commonly used in the drawings.

FIG. 12*c* shows an *x*-second detector designed to produce a high output if the input remains low beyond a predetermined time. With the input line "IN" high (ground), transistor 42 will be conducting and the potential of line 43 will be substantially that of line 44. Thus capacitor 45 will be uncharged. Transistors 46 and 46′ are connected as cascaded emitter followers and under this condition will be conducting, thus applying approximately −6 v. to the base of transistor 47. The emitter of 47 is connected through a resistor to the +12 v. source, but is held substantially at ground potential by diodes 48. Thus transistor 47 will be conducting. Transistor 49 will hence be non-conducting and the output line denoted "OUT" will be low (negative).

If the input line "IN" goes low, transistor 42 will be cut off and line 43 will go positive to ground. Capacitor 45 will start charging toward a potential positive to ground, carrying the base of transistor 46 along with it. If this condition persists, the emitter-follower action of transistors 46, 46' will cause transistor 47 to cease conducting, thereby turning on transistor 49 and yielding a high output in output line "OUT."

If, before the capacitor 45 charges sufficiently to give the high output, the input line goes high, the capacitor will be discharged and the output will remain low. The duration of a low input necessary to give a high output may be predetermined by selection of the charging time constant of the capacitor and the voltage toward which it charges.

Referring now to FIG. 5, a circuit diagram of the control unit 16 is shown. The overall function of the control unit is to supply a starting identification or sync pattern for a multiplex message at the beginning of the day so that the terminal units can begin communicating with each other, and to examine the sync patterns of messages thereafter passing therethrough. If for any reason multiplex messages having a correct sync pattern fail to arrive at the control unit within a predetermined interval, the loop is cleared and a new sync pattern generated. The control unit also serves to reform and rephase the message bits.

A multiplex message of the type shown in FIG. 2 is normally supplied to the message input line 51. A suitable data set may be inserted between the transmission channel and input 51 to provide an appropriate interface for the type of transmission channel employed. Marks or 1-bits have one level, and spaces or 0-bits have another level. The polarities corresponding to mark and spaces may be changed by polarity inverters as required for the proper functioning of the digital units employed.

In FIG. 5 it is assumed that the input message in line 51 has marks at the low level and spaces at the high level, which are inverted in 52 and supplied to lines 53 and 54 with the marks at high level such as shown in FIGS. 6*a* and 7*b*. Another inverter 55 inverts the signal and supplies it to lines 56 and 57. The signals in lines 53 and 56 are used as steering inputs to FF58 and the outputs are supplied through gates 59, 59' to an Input/Output shift register 61. FF58 and register 61 are shifted by $\phi$A pulses in line 62, which are short pulses occurring in the middle of each bit interval. The generation of these pulses will be described later. If gates 59, 59' are open, the input message is shifted through register 61 to the output message line 63. This output is delivered through a data set, if required, to the transmission channel and thence to the next terminal unit, shown as II in FIG. 1.

In order to determine whether the received sync pattern is correct, a sync detector is provided shown in the middle of FIG. 5. In practice there will be an interval between the end of one multiplex message and the beginning of the next, and it is here assumed that there will be at least eight bit intervals. If the last slot of a message is not in use at any time, there will be an interval of more than eight bits. Accordingly, the detector is arranged to count eight or more spaces (0-bits) between messages, then count the eight marks (1-bits) in the sync pattern of the next message (28 in FIG. 2), and then respond to the space at the end of the sync pattern.

To this end, a Space Counter 65 is supplied with message input signals in line 54 through gate 66 to which $\overline{\phi A}$ pulses (inverse of $\phi$A) are applied through line 67. Reset line 68 is also connected to line 54. The counter is arranged so that positive going pulses in line 68 (marks) reset it. On the other hand, due to the invesrion in gate 66, negative signals in line 54 (spaces), gated with negative $\overline{\phi A}$ pulses, will supply positive trigger pulses to the input of counter 65 which will then count spaces.

The operation is illustrated in FIG. 6. Assume that the input signal in line 54 contains eight or more spaces as shown at 69, followed by eight marks as shown at 70, a space 71, and subsequent marks or spaces as shown at 72. The Space Counter 65 will be reset by marks occurring in the interval 73 preceding the spaces. When spaces 69 arrive, the input signal, inverted by 66 and gated by $\overline{\phi A}$ pulses, supplies positive pulses to the counter 65 as shown at (*b*). The counter is a three-stage counter. Thus the 1-output will go high upon counting four spaces and low upon counting eight, as shown at (*c*). This output is supplied to gate 74 along with the input signal which at this time will be low if the sync pattern is valid. Accordingly, after eight counts a positive going signal will be applied to the trigger input of Space Detect FF75 as shown at (*d*). FF75 has steering input $A_1$ connected to −v, and $A_0$ connected through line 76 to line 57. At this time line 57 will be high (inverse of FIG. 6*a*), thus providing a steering input to FF75 such that it will be triggered to its set condition. After being set by the occurrence of eight spaces, FF75 will remain set for any additional spaces until eventually reset. Upon being set, the 0-output goes low, enabling gate 77. Gate 77 also has an input from line 76 which will go low when marks appear, thus opening the gate and providing a high steering input to Mark Detect FF78.

Mark Counter 79, similar to the Space Counter, is supplied with the input signal in line 57, which is the inverse of that shown in FIG. 6*a*. During the spaces line 57 will be high, thus resetting counter 79 through line 76. When the marks in the sync pattern begin, line 57 will go low. This signal is gated by $\overline{\phi A}$ pulses in gate 80 and appears as positive pulses to counter 79 as shown at (*e*). The 1-output of the counter is shown at (*f*). Upon counting eight marks, the input to gate 81 will go low and, since line 76 will then be low, the gate output will go high. This supplies a positive trigger input to the Mark Detect FF78 to set it, as shown at (*g*). The outputs of FF78 are connected to a Sync Detect FF82 which has its trigger input connected to the output of gate 66. If the next bit is a space as shown at 71 in (*a*), the output of gate 66 will go high upon the occurrence of $\overline{\phi A}$ pulse, thus triggering Sync Detect FF82 to its set state. This yields a high Sync Detect signal in the output line 83 indicating that the sync pattern is correct, as shown at (*h*).

Once Mark Detect FF78 is set, a subsequent space such as 71 will reset it through gate 84. Thus, a space will cause line 54 to go low and, when gated by a $\overline{\phi A}$ pulse, the output of gate 84 will go high and force the 0-output of FF78 high, thereby resetting it. The time constant in the steering circuits of FF82 will allow the latter to be switched before the changed steering inputs are effective. The next $\phi$A output of gate 66 will then reset FF82.

If, instead of a space following the eight marks, there is another mark, the output of gate 66 will stay low and will not trigger the Sync Detect FF82. For this condition, the Mark Counter 79 will count another mark, and the 1-output of the first stage thereof will go high. This is fed through line 85 to reset FF78 and FF82. Thus the output of FF82 in line 83 will be low, indicating an invalid sync pattern.

When the Mark Detect FF78 is set at the end of eight marks, the 1-output thereof goes high and resets Space Detector FF75. FF75 can also be reset through line 76 and pulseformer 86 connected to the 0-output thereof. Thus if fewer than eight marks are counted and a space makes line 57 high, pulseformer 86 forces the 0-output of FF75 high to reset it. The pulseformer may take the form of a flip-flop such as shown in FIG. 12*b* with line 76 connected to the trigger input T, steering input $A_0$ and reset R grounded, and $A_1$ held negative. A positive going signal in line 76 will set the flip-flop, and it will reset after a brief interval determined by the circuit time constants. The 0-output may be inverted to provide a positive pulse to reset FF75.

Summarizing the overall operation of the sync detector, after eight spaces FF75 will be set, and will remain set if more spaces occur. If eight marks then follow, FF78 is set and the next 0-bit will trigger FF82 to provide a Sync Detect output in line 83. If there are less than eight spaces, FF75 will not be set. If there are eight or more spaces followed by less than eight marks, FF78 will not be set. If there are more than eight marks in succession, FF78 and FF82 will be reset. Thus there will be no Sync Detect signal if the pattern is invalid.

FIG. 5 shows sources of $\overline{\text{Space Sync}}$, $\overline{\text{Mark Sync}}$ and $\overline{\text{Sync Detect}}$ signals. When eight or more spaces have been counted in 65, the 1-output of Space Detect FF75 goes high corresponding to Space Sync, and the 0-output goes low. The latter is $\overline{\text{Space Sync}}$ and is illustrated in FIG. 6(*i*). When eight marks have then been counted, FF75 is reset so that $\overline{\text{Space Sync}}$ goes high. $\overline{\text{Mark Sync}}$ is obtained from the 0-output of Mark Detect FF78. This is in reset condition until eight marks have been counted, whereupon it is set and then reset by the next space, giving a 0-output as shown at (*j*). $\overline{\text{Sync Detect}}$ is the inverse of that shown at (*h*).

Before proceeding with the use of the Sync Detect signal, the synchronizing generator at the bottom of FIG. 5 will be described. It is assumed that the bit rate of the loop multiplex message is 1 kc. A 32 kc. pulse generator 87 is connected to a five stage divide-by-32 counter 88, the 1 and 0 outputs of the last stage being indicated. The counter is arranged to be reset at the beginning and end of the sync pattern.

The input signals of opposite polarity in lines 54, 57 are applied to respective gates 89, 89' along with the $\overline{\text{Mark Sync}}$ and $\overline{\text{Space Sync}}$ signals described above. Gate 89 receives waveforms such as shown in FIG. 6 at (*a*) and (*j*), and gives an output as shown at (*k*). Gate 89' receives the inverse of (*a*) along with (*i*), giving (*l*). The outputs are combined and supplied to pulseformer 90 arranged to operate on positive transitions only, yielding reset pulses for counter 88 as shown at (*m*). Thus the counter will be reset at the beginning of the marks 70 in (*a*) and at the beginning of the space 71. Accordingly accurate phasing of the 1 kc. output pulses from the counter with the bit intervals is obtained at the beginning of each multiplex message and, with a stable oscillator 87, proper synchronization for the message slots is assured.

The 1-output of counter 88 will go high at a count of 16, and triggers pulseformer 91 to produce corresponding output pulses here assumed to be negative and denoted $\overline{\phi A}$. They are also inverted to form $\phi$A pulses, and occur at a 1 kc. rate at the middle of each bit interval. FIG. 7 shows the 32 kc. pulses at (*a*), an arbitrary message slot signal at (*b*), and $\phi$A pulses at (*c*).

The 0-output of counter 88 goes high at the end of 32 counts, and triggers pulseformer 91' whose output is inverted to form $\phi$B pulses. These occur at the beginning of each bit interval as shown in FIG. 7(*d*).

As described above, the $\phi$A pulses are used to shift the input FF58 and register 61. Accordingly the output signal phase in line 63 will be delayed by one-half a bit interval with respect to the input signal phase, as shown by comparing FIG. 7(*e*) with (*b*). Actually, although impractical to show in FIG. 7, the output signal is additionally delayed by a multiple of bit intervals depending on the number of stages in the register 61. In this specific embodiment the register contains five stages, but the number could be increased to provide additional delay in the loop if desired.

Returning to the use of the Sync Detect signal from FF82, if no Sync Detect is developed during the time required for the passage of one or more multiplex messages around the loop, it is a symptom of faulty operation. Accordingly, the control unit is arranged to clear all signals from the loop and start a new sync pattern.

To this end, an *x*-second detector 92 such as shown in FIG. 12*c* is supplied with the Sync Detect signal. The delay of the detector is chosen to be greater than the loop delay, and is here assumed to be one second. So long as the input signal goes high in less than one second after the previous high signal, the output in line 93 remains low. However, if no valid sync pattern occurs for one second, line 83 will remain low and line 93 will go high. This actuates a D-C flip-flop 94 composed of two cross-connected NOR units such as shown in FIG. 12*a*. The output of 94 will go low and that of 94' high. The former is fed back through an inverter to reset detector 92. The latter high signal is supplied through line 95 to gates 59, 59' at the input to register 61, and closes the gates so that no further signals can pass.

The low output of 94 is also supplied through line 96 to enable gates 97 and 97' leading to the input lines of register 61. After one second all messages in the loop will have been cleared, and a new sync pattern can be inserted. Another one second detector 98 receives the low output of 94 and, after one second, its output line 98' goes high. This is inverted and supplied to gate 99 along with $\overline{\phi B}$ pulses, and the resultant high gate output is supplied to a D-C flip-flop 101, 101'.

Normally the condition of FF101, 101' is such that the output line 102 is high and holds counter 103 reset. When the output of gate 99 reverses the flip-flop, line 102 goes low and the counter starts counting $\phi$A pulses. For the first eight counts the 1-output is low. This enables gate 104 and the high output thereof is applied to gate 97. The inverted output is applied to gate 97'. At this time line 96 will be low. The resultant action of gates 97, 97' is to provide steering inputs for 1-bits to the register 61, and shifting of the register by $\phi$A pulses inserts eight 1-bits or marks in the register. At the end of a count of eight in counter 103, the 1-output goes high and closes gate 104. This reverses the steering inputs provided by gates 97, 97' and subsequent $\phi$A shift pulses introduce 0-bits or spaces into register 61. At the end of a count of 16 the 0-output of 103 goes high, and this is supplied through the pulseformer 105 to reverse flip-flops 101, 101' and 94, 94'. This prevents generating another sync pattern by resetting counter 103, and opens gates 59, 59'. Thus, a new identification or sync pattern has been inserted in the loop so that new multiplex messages may be formed, and the control unit is in condition to process the messages as before.

Turning now to the terminal units, FIGS. 8A and 8B show the portion thereof primarily involved in receiving. The message input in line 111 passes through inverters 112, 113 to FF114 as in the control unit of FIG. 5. The output of FF114 passes through a D-C flip-flop 115 to an Input-Output shift register 116. Register 116 has five stages corresponding to the five bit interval of a message slot. Shifting of FF114 and register 116 is by C1 pulses. These occur in the middle of the input bit intervals as shown in FIG. 7(*f*). Their development will be described later.

If there are no message characters in the slot corresponding to the particular receiver, the message is passed through the register 116 to the output line 117 as in the case of the control unit. Provision is made to detect the presence of a message character in the slot of the particular receiver, whereupon the contents of register 116 are entered in the intermediate storage register 118 where it remains until a parity check has been made and the character checked for all blanks. If the character appears to be correct, it is transferred by 119 to a receiver output register 121 and then to a recording device here shown as a Teletype receiver 122.

FIG. 8A uses a number of signals developed in the portions shown in FIG. 8B, so the latter will now be described.

In the upper part of FIG. 8B a Sync Detector 121 is shown which is similar to that employed in the control unit of FIG. 5. It contains similar space and mark counters, space and mark detectors, and a sync detector. The Sync Detect output is here designated S3 and the inverse is $\overline{S3}$. The detector also provides $\overline{\text{Mark Sync}}$ and $\overline{\text{Space Sync}}$ outputs for resynchronizer 122–125 which is similar to that shown in FIG. 5 at 88–90.

The output of counter 122 will be short pulses recurring at a 1 kc. rate. They are supplied to a 4-phase clock generator 127 to yield different phases C1–C4, as shown in FIGS. 7(*f*) through (*i*). Pulses C1 occur at the middle of the bit interval, pulses C3 occur at the beginning of the bit intervals, and pulses C2 and C4 occur midway between the others as shown. The several phases may be obtained by the use of pulseformers and selected outputs of the stages of counter 122, as will be understood by those skilled in the art.

The middle portion of FIG. 8B shows an arrangement for decoding the slots of the message signal of FIG. 2, and the bit intervals therein. A divide-by-8 bit counter 131 repeatedly counts C1 pulses obtained by inverting $\overline{C1}$ pulses in gate 135. Each count of 8 actuates a divide-by-4 slot counter 132. If more or fewer bits are employed in a slot, counter 131 may be changed accordingly, and if more or fewer slots are employed in a message, counter 132 may be changed accordingly. The counters are arranged so as not to count until a proper sync pattern is received. To this end, $\overline{S3}$ is inverted by 133 and applied to to line 130 to reset counters 131, 132, and lock-up FF134 when a pulse indicating a valid syn pattern is produced, as shown in FIG. 6(*h*). $\overline{S3}$ is also inverted by 133' and applied to the input of counter 131 to prevent any triggering by transients during reset. When slot counter 132 has completed its count, a trigger signal is applied to lock-up FF134 to set it. This causes the 1-output thereof to go high, thus delivering a high level signal through line 136 back to gate 135 to cut off the further supply of $\overline{C1}$ pulses to the counter. The 0-output of FF134 is connected to its $A_0$ input to provide a steering input. When reset, $A_0$ will be high so that a trigger input will set it.

The bit counter 131 is a three-stage counter and the 0- and 1-outputs of each stage are supplied to a bit decoder 137 which selectively combines the outputs to deliver output pulses during the 1st, 2nd and 8th bit intervals, as indicated by output lines BP1, BP2 and BP8. Outputs BP1 and BP8 are also designated Slot Sync and Slot End since they correspond to the first and last positions in each slot.

The slot counter 132 has two stages, and the 0- and 1-outputs of each stage are supplied in selective combinations to the slot decoder gates 138–141 to yield respective high level signals corresponding to Slot 1 through Slot 4, as indicated. The 1-output of lock-up FF134 is gated by S3 in 143 and inverted in 144 so that the Slot 1 signal cannot begin until after the sync detect pulse has been developed and S3 goes low, at which time the 1-output of FF134 will be low. When FF134 is set upon completion of the slot count, the high 1-output thereof inhibits gates 138–141 and prevents further development of Slot 1-Slot 4 signals until another message having a valid sync pattern is received.

The lower portion of FIG. 8B is used to determine whether a multiplex message contains a message in the time slot of the particular receiver. Line 144 is supplied with the output of one of slot decoder gates 138–141 which corresponds to that particular terminal unit. This signal is inverted in 145 and supplied to a gate 146 along with $\overline{S1}$ and $\overline{\text{Slot Sync}}$. $\overline{\text{Slot Sync}}$ will be low during bit position 1. $\overline{S1}$ is obtained from FF114 in FIG. 8A and corresponds to the message input. As explained before, if there is a mesage for a given receiver, the corresponding slot will contain a busy bit (binary 1) in its first bit position. Hence under these circumstances $\overline{S1}$ will be low. Accordingly the output of gate 146 will be high and provides steering inputs to FF147 which will then be triggered to its set state by the next C2 pulse. The resultant high 1-output is inverted by 148 to give a low output in line 149. FF147 is reset by the pulse in line 130 indicating a valid sync pattern.

During the next succeeding bit position 2, $\overline{\text{Slot Sync}}$ will go high, thus cutting off gate 146 and reversing the steering inputs to FF147. The succeeding C2 pulses will hence reset FF147 and line 149 will go high. Line 149 supplies the trigger input of FF151. If there is an Acknowledge bit in positon 2, the message has been received previously and hence in invalid. Under these circumstances the S1 input to FF151 will be high, so that FF151 will be set. The 0-output thereof will go low and upon inversion in 152, will yield a high signal in line CRS (Clear the Receiver Slot). FF151 has its reset terminal grounded to reset the flip-flop promptly, thus causing the CRS signal to be a short positive pulse. If the Acknowledge bit is not present in the slot, the CRS line will remain low. The CRS signal is supplied to the register 116 in FIG. 8A as will be described.

FF153 also has its trigger input connected to line 149. This flip-flop will have been reset at the end of a previous Receive slot through line 150 . Input signal $\overline{S1}$ is supplied as a steering input. If an Acknowledge bit is not present, $\overline{S1}$ will be high and FF153 will be set when FF147 is reset. Thus, the 0-output will be low and is denoted $\overline{\text{VRC}}$ (Valid Receive Character). This indicates that the received character is valid insofar as the presence of a Busy bit and absence of an Acknowledge bit are concerned, and accordingly the receiver should insert an Acknowledge bit to indicate the character will be acted upon. This is accomplished with the aid of gates 154 and 155. The Acknowledge bit is to be inserted in bit position 2. At this time BP2 will be high, and is inverted by 154 to supply a low input to gate 155. Upon the occurrence of a $\overline{C3}$ pulse, a positive pulse will be delivered to line 156 which is connected to S1 in FIG. 8A so as to insert an Acknowledge bit in the second bit position of the signal slot then passing to the shift register 116.

If an Acknowledge bit is already present in the receiver slot, the $\overline{S1}$ input to FF153 will below, thus leaving FF153 reset. $\overline{\text{VRC}}$ will be high, indicating an invalid received character, and gate 155 will be closed so that an Acknowledge bit is not generated.

The message in the time slot is checked for parity before being utilized. To this end a parity check FF158 has its input and output terminals back-connected, as shown, to form a toggle flip-flop. The flip-flop is reset by the BP2 output of bit decoder 137, gated by $\overline{C3}$, so that it is in its reset state the beginning of the 3rd bit position of each time slot. The message input signal $\overline{S1}$ is gated by $\overline{C2}$ in 159 and supplied to the trigger input of FF158. As 1-digits occur in bit positions 3–8 (FIG. 2), FF158 will toggle. In this embodiment odd parity is employed. Hence at the end of a slot FF158 should be in its set condition if parity is correct, and the 1-output will be high. This gives $\overline{\text{PE}}$, as indicated. If parity is incorrect, the 1-output will be low and will enable gate 161. This gate is also supplied with the inverted Slot End signal and with $\overline{\text{VRC}}$. Accordingly, if a parity error exists, line 162 will supply a high steering input to FF163 which will then be triggered to its set state by the next C3 pulse. The 0-output will go low and lights lamp L1 in FIG. 4. FF163 may be manually reset by SW1 in FIG. 4.

Returning now to FIG. 8A, as before described the input message bits are shifted into register 116 by C1 pulses. The input stage 116' of the register can be reset by a CRS pulse, as indicated. CRS will be developed if there is both a busy bit and an acknowledge bit in the message, at which time the busy bit will be in register stage 116'. Accordingly, the reset will remove this bit from the message. Thereafter multiplex messages travelling around the loop will not have busy bits in the corresponding receiver slot until a new transmission is produced. This operation is utilized at the end of a transmitted message to render the slot available. Thus, when a given transmitter has finished its message to a given receiver, the acknowledge bit is not removed by the transmitter and hence the receiver clears the busy bit from its slot. It is not necessary to remove the acknowledge bit from the message since in this embodiment a new transmitter looks only for a busy bit in the slot of the receiver to which it desires to transmit.

If the message is valid, the message data in bit positions 3–7 will be transferred to the intermediate storage register 118. Registers 116 and 118 each have five stages with the outputs of the stages in register 116 connected to the steering inputs of corresponding stages in register 118. The stages in register 118 are triggered in parallel by a pulse in line 163. Gate 164 is supplied with $\overline{\text{Slot}}$ $\overline{\text{End}}$, $\overline{\text{VRC}}$ and $\overline{\text{C2}}$. If the received character is valid, a positive pulse will be developed in line 163 just before bit position 8 is shifted into register 116, to effect the transfer of 3–7 in parallel.

If the parity check described in connection with FIG. 8B shows a parity error in the character, register 118 is arranged to be set by FF165 to an arbitrary character selected to be as much out of context as possible, for example, *z*. Gate 166 receives the signals indicated, and develops a high output if a parity error exists, thus setting FF165 by the next C3 pulse. The 0-output will go low and, upon inversion, will supply a high input to register 118 which is connected internally to generate the out-of-context character.

Upon occasion, the data portion of the message slot may be all 0-bits since the time of travel of the multiplex message around the loop will commonly be less than the character interval of a Teletype transmitter. It is desirable to avoid printing out a blank when this occurs, and accordingly a Detect Blank circuit 167 is connected to the individual stages in register 118 to give a high DB output when the stages correspond to all 0-bits. The use of the DB signal will be described later.

The five data bits in register 118 are entered by transfer circuit 119 into an output shift register 121. The output register supplies the data bits to Teletype receiver 122. Teletype receivers commonly accept bits at a considerably lower rate than that in the loop transmission circuit. One conventional type operates at the rate of 50 Baud pulses per second, and this rate is here assumed. A Teletype character starts with a space and ends with a mark as described in connection with FIG. 3. Output register 121 is provided with six stages, of which the output stage 121' is arranged to always reset to zero. The opposite stage 121'' is provided with steering inputs (ground and —V) corresponding to a 1-bit. Consequently, when six shift pulses have been applied, the level of output line 171 will correspond to a mark, and all six stages in register 121 will be in their 1-states. The transfer circuit contains gates arranged to reset selectively five stages of the register 121, or leave them set, depending on the states of the corresponding stages in intermediate register 118.

Shift pulses at a 50 c.p.s. rate are obtained by dividing the 1 kc. C2 pulses in divide-by-20 counter 172, supplying the output thereof to pulseformer 173, and supplying the resultant pulses through line 174 to shift register 121. Counter 172 has five stages arranged to be present for a count of 20, by an inverted pulse from 173 in lines 170, 170'. Seven shift pulses suffice to transfer the contents of register 121 to the Teletype receiver 122, but the last mark interval should be 1.4 bit intervals, giving a total of 7.4 bit intervals corresponding to the length of a Teletype character of FIG. 3. This is obtained by an Output Shift Control FF176 which controls the application of shift pulses to register 121.

At the beginning of a Teletype cycle, FF176 will be in its reset condition, as will be described, and is provided with a steering input through gate 177. This gate is arranged to be actuated after 7.4 bit intervals. To this end the output of pulse former 173 is supplied to a divide-by-7 counter 178 which produces an enabling signal through line 179 to gate 177 after seven Teletype bit intervals. The output of counter 172 is supplied to the same gate through line 181. To provide for the additional 0.4 bit interval an output is obtained at the 8th count in counter 172 and supplied through line 182 to gate 177. Consequently gate 177 will be actuated after 7.4 bit intervals at the Teletype rate and supply a high steering input to FF176 which will then be set by the next trigger pulse C3. The 1-output will go high and reset counters 178 and 172. The 0-output is inverted in 183 and supplied through line 170' to counter 172 to preset it. Line 179 will go high to inhibit gate 177 until the cycle is repeated.

FF176 will remain set until a new character is available to be transferred. This is ascertained by New Character Available FF184. A steering input to FF184 is provided by gate 185. When a new character is available in intermediate register 118, the inputs to the gate designated $\overline{\text{Slot}}$ $\overline{\text{End}}$ and $\overline{\text{VRC}}$ will be low. If the character is all zero's, the input DB will be high and inhibit the gates. However, if DB is low, the output of gate 185 will go high and FF184 will be set by the next C4 pulse. The 0-output will then go low, thus enabling gate 186. If at this time a Teletype cycle has been completed, FF176 will be in its set state and the 0-output thereof to gate 186 will be low. Consequently the output of gate 186 will supply a high steering input to pulseformer 187 which will be set by the next C1 pulse, and promptly reset by the ground connection to R. Accordingly a negative pulse will be produced by the 0-output thereof and is delivered to transfer circuit 119 to effect the transfer. The negative pulse is inverted in 188 and resets FF176 and FF184. Resetting of FF176 allows a new Teletype cycle to be produced by counters 172 and 178.

The overall effect of FF176 and FF184 and the associated circuits is to prevent the entering of the bits of a new character in register 121 until the previous character has been shifted out, and to effect the entering only when a new character is present in intermediate storage register 118.

Under normal operation a message character in one multiplex message is supplied to the Teletype receiver 122 before another is received. If there is an overlap, faulty operation is indicated. Accordingly an Overlap Detector is provided by FF191. The output of gate 164 designated GG effects the entering of data from Input/Output register 116 into intermediate Register 118, and is applied to the trigger input FF191. At this time, if there is no message overlap, the New Character Available FF184 will be reset and FF191 will not be actuated. However, if FF184 is set, the high 1-output thereof will provide a steering input to FF191 which will thereupon be set by the GG signal, indicating an overlap error. The 0-output is supplied to lamp L2 in FIG. 4 to indicate the error. FF191 may be manually reset by switch SW1 in FIG. 4.

Turning now to the transmission from a terminal unit, reference is made to FIG. 9. Overall, a Teletype transmitter 201 initially fills the Input Register 202. The contents of register 202 are entered by transfer 203 into Output Register 204 under the control of Transfer Control 205. The contents of register 204 are then supplied by Lines OST, $\overline{\text{OST}}$ to the input of register 116 (FIG. 8A) along with a busy bit from generator 206 and a parity bit, if necessary, from generator 207. The following gives details.

Teletype transmitter 201 has its output inverted by 212 and supplied to line 213. The output is again inverted by 214 to provide signals in line 215 of the initial polarity. It is assumed that marks from transmitter 201 are high, and spaces low. The signals in lines 213 and 215 are used as steering inputs to a 7-stage input register 202. The steering inputs are arranged so that Teletype marks correspond to the reset conditions of the stages in register 202. Accordingly, when register 202 is reset by a signal in line 217, all stages therein will correspond to marks.

When a 7-bit Teletype character as shown in FIG. 3 is inserted in register 202, the output stage denoted 1 will provide a 0-output in line 218 which will be low for a space, thus permitting the character to be recognized. At the same time the input stage denoted 7 will contain a mark, and the 1-output thereof in line 219 will be low. These outputs are supplied to gate 221 along with a Transmit Slot signal corresponding to the receiver to which it is desired to transmit, selected by switch SW4 in FIG. 4*c*. The contents of Output Register 204 are shifted out during the selected slot interval as will be explained and, to avoid destroying the character being transmitted, transfer of a new character should take place outside this interval when the Transmit Slot signal in line 36 is low. Accordingly, when a character is in input register 202, and the Transmit Slot signal is low, gate 221 will supply a high steering input to FF222 which will then be set by the next C2 pulse to actuate transfer circuit 203 as will be described further.

Shifting of Teletype bits into Input Register 202 is produced by shift pulses from a divide-by-20 counter 223 supplied with C1 pulses. A D-C Input Control FF224, 224′ holds the counter reset until the Teletype transmitter begins to transmit. Normally a Teletype transmitter marks continuously between messages, thus producing negative pulses in line 213 which are inverted by 224 to supply positive reset pulses to counter 223. When a space occurs at the beginning of a Teletype character, line 213 goes high and switches FF224, 224′ to allow counter 223 to count. Thus shift pulses will be developed in line 225 and the Teletype characters will be shifted into register 202.

When the Teletype character is registered in 202, and 222 set, as above described, the 0-output thereof goes low and actuates transfer circuit 203 to enter the contents of the five data bit stages of register 202 in parallel into respective stages of output register 204. The set condition of FF222 supplies steering inputs to FF226 which is thereupon set by the next C3 pulse. The 1-output goes high, thereby resetting FF222 and also switching input control FF224, 224′ to its reset condition, stopping counter 223. When FF222 is reset, the 0-output goes high to inhibit transfer circuit 203. To avoid possible adverse effects of transients, the 0-output of FF226 is inverted and also inhibits 203 when it is set.

The contents of Output Register 204 are shifted out under the control of the Transmit Slot and Slot Sync Signals. When the Transmit Slot signal in line 36 is high, corresponding to the desired receiver slot, the signal is inverted in 227 and enables gate 228. The Slot Sync signal is high during the BP1 interval from bit decoder 127 (FIG. 8B) and thereafter goes low. This opens gate 228 and the $\overline{C2}$ pulses shift the contents of register 204 to the output lines designated OST and $\overline{OST}$.

The steering inputs to register 204 are selected so that, after the contents have been shifted out, all stages are in their set states. The utilization of the output polarities is such that the set states correspond to spaces. Hence, if a new Teletype character has not been entered in output register 204, the transmitted data bits are all zeroes. When a character is entered, the proper stages of register 204 are reset, or left set, in accordance with the character bits.

As before stated, when a message character is transmitted the first bit of the corresponding slot (FIG. 2) has a busy signal inserted therein. This is accomplished by Busy Bit Generator 206. The $\overline{\text{Slot Sync}}$ signal is applied to gate 229 along with $\overline{C2}$ pulses. $\overline{\text{Slot Sync}}$ will go low at the beginning of the shift out of register 204 and the $\overline{C2}$ will cause line 230 to go high, thus resetting the output stage 204′. The reset condition corresponds to a mark, and accordingly a mark will be delivered to the output lines OST, $\overline{OST}$ in the first bit position of the multiplex message slot.

The Parity Insert Generator 207 includes a toggle FF211 which is reset through gate 232 during the bit position 2 interval by $\overline{BP2}$ and $\overline{C4}$. A trigger input is supplied through gate 233. This gate is enabled during bit positions 3–7 corresponding to the data bits, since the Slot End signal is then low. Slot End goes high for bit position 8 and inhibits the gate. Output line OST will be high for spaces and low for marks. Consequently each mark in bit positions 3–7 will enable gate 233 and pass a $\overline{C3}$ pulse to trigger FF231. The 1-output of FF231 is supplied to gate 234. With odd parity as here assumed, if the number of data marks in the signal shifted out is odd, FF231 will be set at the end of the data bits, and the high 1-output will inhibit gate 234. If an even number of marks is counted the 1-output will be low, thus enabling gate 234. Upon the occurrence of $\overline{\text{Slot End}}$ during the 8th bit position, gate 234 will transmit a $\overline{C3}$ pulse which is fed through line 230 to reset the output stage 204′ of the register. Thus a mark will be transmitted in the 8th bit position to provide the desired odd parity.

Output lines OST and $\overline{OST}$ of register 204 are connected to the steering inputs of the Input′Output shift register 116 of FIG. 8A through gates 236, 236′. These gates are supplied in parallel with $\overline{\text{Transmit Enable}}$ and $\overline{\text{Transmit Slot}}$ signals so that they are enabled only when it is desired to transmit, and only during the occurrence of the slot corresponding to the receiver to which it is desired to transmit. C1 pulses then shift the new message through register 116 to the message output line 117 and it travels around the loop of FIG. 1 as before described. The outputs of gates 236, 236′ force the output line of FF115 to the corresponding polarities so that any bits then circulating in the correponding time slot are replaced by the bits of the new character.

Transmission is controlled from the console illustrated in FIG. 4, with associated logic circuits shown in FIG. 10. These will now be described together.

When it is not desired to transmit, switch SW3 in FIG. 4*b* will be in the position shown, and line 34 will be low. The same line is shown in FIG. 10 as an input to inverter 241 which supplies a high signal through line 242 to reset Transmit Enable FF243. The 0-output causes the $\overline{\text{Transmit Enable}}$ signal to be high, thereby inhibiting gates 236, 236′ in FIG. 8A and preventing transmission.

When it is desired to transmit, SW3 is moved to its opposition position and grounds line 34. The resultant high input and low output of inverter 241 enables gate 244. $\overline{\text{Transmit Slot}}$ and $\overline{\text{Slot Sync}}$ signals are applied to gate 245 and the gate output in line 246 goes high during bit position 1 of the time slot of the selected receiver. This is inverted in 247 to make line 248 low, thus enabling gate 244. If at this time S1 is low, indicating the absence of a busy bit in the time slot, a high steering input will be supplied to FF243 and it will be set by the next C2 pulse. The 0-output will go low, causing $\overline{\text{Transmit Enable}}$ to go low and enabling gates 236, 236′ in FIG. 8A for transmission. The 0-output will also light lamp L6, indicating that the time slot has been captured. L6 will normally remain lighted until the transmit switch SW3 is opened.

If S1 is high during bit position 1, indicating the presence of a busy bit in the time slot and hence that the slot is already in use, gate 244 will be inhibited and FF243 will remain reset. Thus transmission cannot occur.

Busy FF251 is employed to light lamp L8 whenever the selected receiver slot contains a busy bit indicating it is in use. The low condition of line 248 enables gates 252 and 253. A $\overline{C2}$ pulse at gate 252 resets FF251 to deenergize L8. If the slot contains a busy bit, $\overline{S1}$ will be low and the $\overline{C3}$ pulse occurring immediately after the $\overline{C2}$ pulse will pass through gate 253, causing line 254 to go high and setting FF251 to light lamp L8. Thus L8 will be deenergized momentarily each time the Transmit Slot occurs, and immediately reenergized if a busy bit is present in the slot. It may be noted that L8 will be lighted whether a busy bit has been inserted by that transmitter or by another transmitter.

If, during the course of transmission, the multiplex message returns to the transmitter with the busy bit deleted, communication with the intended receiver has been lost. This is indicated by Line Loss FF255. When FF243 is set to enable transmission, the 1-output thereof provides a high steering input to FF255. Gate 256 is enabled by the low level of line 248 during bit position 1. If at this time S1 is low, no busy bit is present and FF255 is triggered by $\overline{C2}$. This lights lamp L4.

Parity error is also checked after the transmitted message has gone around the loop and returns to the originating transmitter. As will be understood from the foregoing, the data bits and parity bits in a given slot of the multiplex message are not removed by the corresponding receiver. These bits will continue recirculating until changed by a new transmission in the same slot. All slots are checked for parity error by FF158 and associated circuits in FIG. 8B. FF158 operates on signal $\overline{S1}$ of FIG. 8A, which corresponds to the multiplex message before a new transmission is effective to change the slot contents.

Parity Error FF257 receives a steering input from gate 258 which is supplied with $\overline{PE}$ and $\overline{\text{Slot End}}$. The gate is enabled by $\overline{\text{Transmit Slot}}$ and $\overline{\text{Transmit Enable}}$ applied to gate 259 and inverted by 261. Consequently, as the message in the selected receiver slot returns to the transmitter, any parity error will cause FF257 to be triggered by C3 and light lamp L3.

If an Acknowledge bit is not inserted by a receiver, the receiver is not responding properly to the message. A No Receive FF262 indicates this condition. It receives a steering input from gate 263 which is supplied with the inputs shown. If S1 is low during bit position 2 of the selected slot, the acknowledge bit is not present and FF262 is set by C2 to light lamp L5.

The overall operation of the embodiment described may be summarized by reference to FIG. 11. Assume that a message is to be transmitted from Terminal Unit I (FIG. 1) to Terminal Unit III. At (*a*) time slot III of FIG. 2 is illustrated and the bit positions indicated. It is assumed that this slot of the multiplex message is passing around the loop with a space in position 1 indicating the absence of a busy bit and therefore that the slot is available. The remaining bits may be spaces or arbitrary. The absence of a busy bit is indicated by L8 in FIG. 4 at Terminal Unit I.

When it is desired to transmit, time slot III is selected by SW4 in FIG. 4C and transmit switch SW3 is actuated. This lights lamp L7 and, through FF243 in FIG. 10, enables the transmit gates 236, 236' in FIG. 8A. Signals OST, $\overline{OST}$ are applied to these gates from the output register 204 in FIG. 9 during time slot III. A mark will be inserted by the busy bit generator 206 in bit position 1, as shown in FIG. 11(*b*). This will be followed by a space in position 2, the first character of the message in positions 3–7, and a parity bit if necessary in position 8. When the multiplex message arrives at Terminal Unit III, it passes through the Input/Output shift register 116 (FIG. 8A) thereat. During time slot III, the receiver checks for parity, etc. and supplies the character 1 to the Teletype receiver 122 at Unit III. In the meantime, an Acknowledge bit will have been generated in lines 156 (FIG. 8B), and supplied to S1 of FIG. 8A, thereby inserting a mark in position 2 as shown in FIG. 11(*c*). The remaining bit positions will remain unchanged and the slot will return to transmitter I. As shown in FIG. 11(*d*), the transmitter I then deletes the Acknowledge bit and transmits a new character 2 in the same manner as shown at (*b*). This is operated on by receiver III and the Acknowledge bit inserted as shown at (*e*), and the message returns to transmitter I.

This procedure continues until the entire Teletype message has been transmitted. Then the Teletype transmitter 201 in FIG. 9 will start marking continuously, and there will be no further supply of characters to output register 204. In shifting out the last character, the steering inputs to register 204 will have set all stages to spaces. However, a busy bit will be inserted in position 1, followed by spaces and a parity bit in position 8, as shown in FIG. 11(*f*). When this message arrives at receiver III, the receiver will insert an acknowledge bit as shown in FIG. 11(*g*). The transmission and reception shown in FIGS. 11(*f*) and (*g*) will continue until the transmit switch S3 in FIG. 4 is turned off. This will reset Transmit Enable FF243 (FIG. 10) and remove the $\overline{\text{Transmit Enable}}$ inputs to gates 236, 236' in FIG. 8A. Thus no further transmission can occur, and any bits remaining in slot III will pass through register 116 along with the rest of the multiplex message.

At this time a message such as shown at FIG. 11(*g*) will be in the loop, and when it reaches receiver III the receiver will note the presence of the Acknowledge bit. This will develop a CRS signal as described in connection with FIG. 8B which, applied to the Input/Output shift register 116 (FIG. 8A), will clear the busy bit from its slot. Accordingly, the message delivered by receiver III to the loop will be as shown in FIG. 11(*h*). This can now recirculate indefinitely until the same or another transmitter desires to transmit in slot III. The transmitter operator will note the absence of a busy bit in position 1, indicated by L8 in FIG. 4, and accordingly can proceed to transmit as described above.

If lamps L3, L4 or L5 light up at Terminal Unit I during transmission, an operating difficulty is indicated. When the difficulty has been found and removed, switch SW2 may be actuated to reset the corresponding flip-flop (FIG. 10) and operation resumed. Similarly if lamps L1 or L2 light up at receiver III, an operating difficulty is indicated. When removed, SW1 may be actuated to reset the corresponding Parity Error FF163 (FIG. 8B) or Overlap Error FF191 (FIG. 8A).

The loop arrangement of FIG. 1 employs simplex transmission lines for transmission in only one direction from one unit to the next. Duplex lines providing for transmission in both directions are available at only slightly added cost. Depending on the physical location of the terminal units, it may be more economical to employ duplex lines. FIG. 13 shows such an arrangement, wherein transmission in one direction from units I through IV is provided by lines 271, and in the opposite direction by lines 272. The loop is completed by a connection 273 at unit IV and 274 at unit I. The return path provided by lines 272 may simply pass through the respective units as shown by dotted lines, or equipment may be added to reform the multiplex message, add delay, etc., as desired.

In the foregoing it has been assumed that only one multiplex message is in the loop at any given time. If the messages are sufficiently short compared to the loop delay, more than one could be inserted in the loop within a loop delay interval by generating sync patterns at the proper times. Also it has been assumed that one transmitter transmits to only one receiver at a given time. If it is desired to transmit simultaneously to a plurality of receivers, the transmitter could be arranged to insert message characters in more than one time slot, or a given time slot could be shared by a plurality of receivers.

These and other modifications may be made by those skilled in the art to meet the requirements of a particular application. Also, selected features may be employed and others omitted as desired.

We claim:

1. A communication system comprising a plurality of terminal units connected by communication channels in a loop configuration, means for repeatedly transmitting a multiplex message identification pattern around said loop, receiving means at a plurality of said terminal units for receiving message characters in respective time slots of said multiplex message predetermined with respect to said identification pattern, and transmitting means at at least one of said terminal units for selecting a time slot in said multiplex message corresponding to another terminal unit and transmitting message characters therein successively in successive multiplex messages, said time slots having respective predetermined locations therein for a busy indication, said transmitting means including means for recognizing the presence of a busy indication in a time slot and inhibiting transmission therein, and means for inserting a busy indication in a time slot when transmitting a message character therein.

2. A communication system comprising a plurality of terminal units connected by communication channels in a loop configuration, means for repeatedly transmitting a multiplex message identification pattern around said loop, receiving means at a plurality of said terminal units for receiving message characters in respective time slots of said multiplex message predetermined with respect to said identification pattern, and transmitting means at at least one of said terminal units for selecting a time slot in said multiplex message corresponding to another terminal unit and transmitting message characters therein successively in successive multiplex messages, said time slots having respective predetermined locations therein for a busy indication, said transmitting means including means for inserting a busy indication in a time slot when transmitting a message character therein, said receiving means comprising an input/output register through which said multiplex messages pass, an intermediate storage register, a receiver output register and a recording device, means for determining the presence of a message character in said input/output register in the corresponding time slot and entering the character in said intermediate storage register, means for supplying a message character in said receiver output register to said recording device, and means responsive to a new character in said intermediate storage register and the absence of a character in said receiver output register for entering said new character therein.

3. A communication system comprising a plurality of terminal units connected by communication channels in a loop configuration;

means for repeatedly transmitting a multiplex message identification pattern around said loop;

receiving means at a plurality of said terminal units for receiving message characters in respective time slots of said multiplex message predetermined with respect to said identification pattern;

transmitting means at at least one of said terminal units for selecting a time slot in said multiplex message corresponding to another terminal unit and transmitting message characters therein successively in successive multiplex messages;

a control unit connected in said loop having an input/output channel through which said multiplex messages pass;

means at said control unit for checking the identification patterns in multiplex messages passing therethrough; and means responsive to the absence of a correct identification pattern for eliminating signals in the loop.

4. A system in accordance with claim 1 in which said time slots have respective predetermined locations therein for an acknowledge indication, said receiving means comprising means for determining the presence of a busy indication in its respective time slot, and means responsive to said determining for inserting an acknowledge indication in its respective time slot.

5. A system in accordance with claim 4 in which said transmitting means includes means for deleting an acknowledge indication from the time slot of a receiving means to which it is transmitting, and said receiving means includes means for deleting the busy indication from its time slot when a message containing both busy and acknowledge indications in its time slot is received.

6. A system in accordance with claim 4 in which said receiving means comprises (a) an input/output register through which said multiplex messages pass, an intermediate storage register, a receiver output register and a recording device, (b) means for determining the presence of a message character in said input/output register in the corresponding time slot with a busy indication but no acknowledge indication and means responsive thereto for entering the character in said intermediate storage register, (c) means for supplying a message character in said receiver output register to said recording device, (d) and means responsive to a new character in said intermediate storage register and the absence of a character in said reeciver output register for entering said new character therein.

7. A system in accordance with claim 2 in which said recording device is a teletypewriter receiver and said transmitting means includes a teletypewriter transmitter having a predetermined character rate, the loop delay being predetermined to be not greater than the period of the teletypewriter characters, said receiver output register being a shift register, and said receiving means including a source of shift pulses for shifting the contents of the receiver output register to said teletypewriter receiver and means responsive to said shifting for indicating said absence of a character in the receiver output register.

8. A system in accordance with claim 3 in which said control unit includes means responsive to the absence of a correct multiplex message identification pattern for a predetermined time for generating a new identification pattern, and means for inserting said new identification pattern in said loop.

9. A system in accordance with claim 3 in which said control unit includes means responsive to the absence of a multiplex message identification pattern for a predetermined time greater than the loop delay for closing said input/output channel to eliminate any signals in said loop, an identification pattern generator, and means for inserting an identification pattern from said generator in said loop a predetermined time after said channel closing and reopening the channel.

References Cited

UNITED STATES PATENTS

| | | |
|---|---|---|
| 2,406,165 | 8/1946 | Schroeder. |
| 3,065,302 | 11/1962 | Kaneko. |
| 3,258,536 | 6/1966 | Lugten. |

RALPH D. BLAKESLEE, Primary Examiner

U.S. Cl. X.R.

178—50; 340—147